United States Patent [19]
Krause

[11] Patent Number: 6,120,192
[45] Date of Patent: Sep. 19, 2000

[54] SPLICING MEANS FOR WELDING LIGHT WAVEGUIDES

[75] Inventor: Dieter Krause, Oberschweinbach, Germany

[73] Assignee: Siemens Aktiengesellschaft, Munich, Germany

[21] Appl. No.: 08/973,637

[22] PCT Filed: Jun. 5, 1996

[86] PCT No.: PCT/DE96/00991

§ 371 Date: Dec. 5, 1997

§ 102(e) Date: Dec. 5, 1997

[87] PCT Pub. No.: WO96/41220

PCT Pub. Date: Dec. 19, 1996

[30] Foreign Application Priority Data

Jun. 7, 1995 [DE] Germany ............... 195 20 734

[51] Int. Cl.$^7$ ............................................. G02B 6/255
[52] U.S. Cl. ................................. 385/96; 385/98
[58] Field of Search ...................... 385/95, 96, 97, 385/98

[56] References Cited

U.S. PATENT DOCUMENTS

| | | | |
|---|---|---|---|
| 5,002,351 | 3/1991 | Szanto et al. ............... | 385/86 |
| 5,146,527 | 9/1992 | Mallinson .................. | 385/98 |
| 5,524,163 | 6/1996 | Kobayashi et al. .......... | 385/96 |
| 5,638,476 | 6/1997 | Zheng ....................... | 385/96 |

FOREIGN PATENT DOCUMENTS

| | | |
|---|---|---|
| 280 399 A1 | 2/1989 | Germany . |
| 52-115233 | 9/1977 | Japan . |
| 59-136708 | 8/1984 | Japan . |
| 62-195607 | 8/1987 | Japan . |

*Primary Examiner*—John D. Lee
*Attorney, Agent, or Firm*—Hill & Simpson

[57] ABSTRACT

A splicing means for welding light waveguides in or immediately at optical components is disclosed which includes an optical means for observing the ends of the light waveguides to be welded together and two oppositely directed electrodes arranged parallel but spaced apart from one another which affect the welding of the light waveguides by igniting an arc. Observation of the ends of the light waveguides to be welded is provided in the welding position by a stepped arrangement of electrodes whereby the electrode axes are offset from one another. Due to the stepped arrangement of the electrodes, the light waveguides can be observed in, for example, the region of a trans-axial channel of a light waveguide plug and can then be welded to one another in the same position.

8 Claims, 2 Drawing Sheets

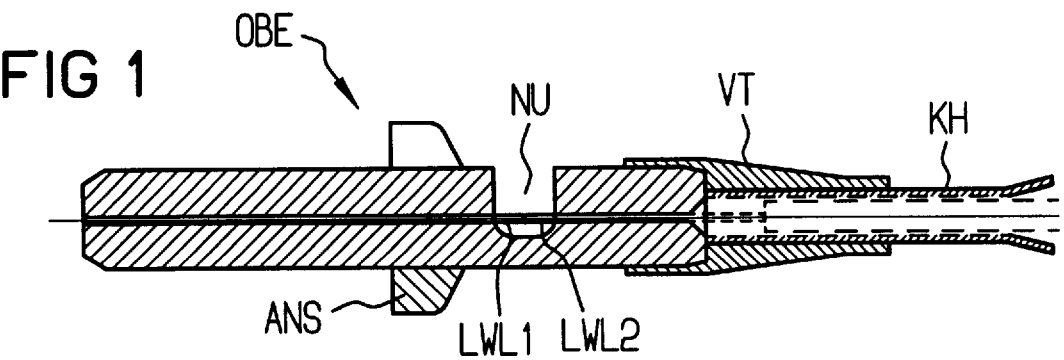
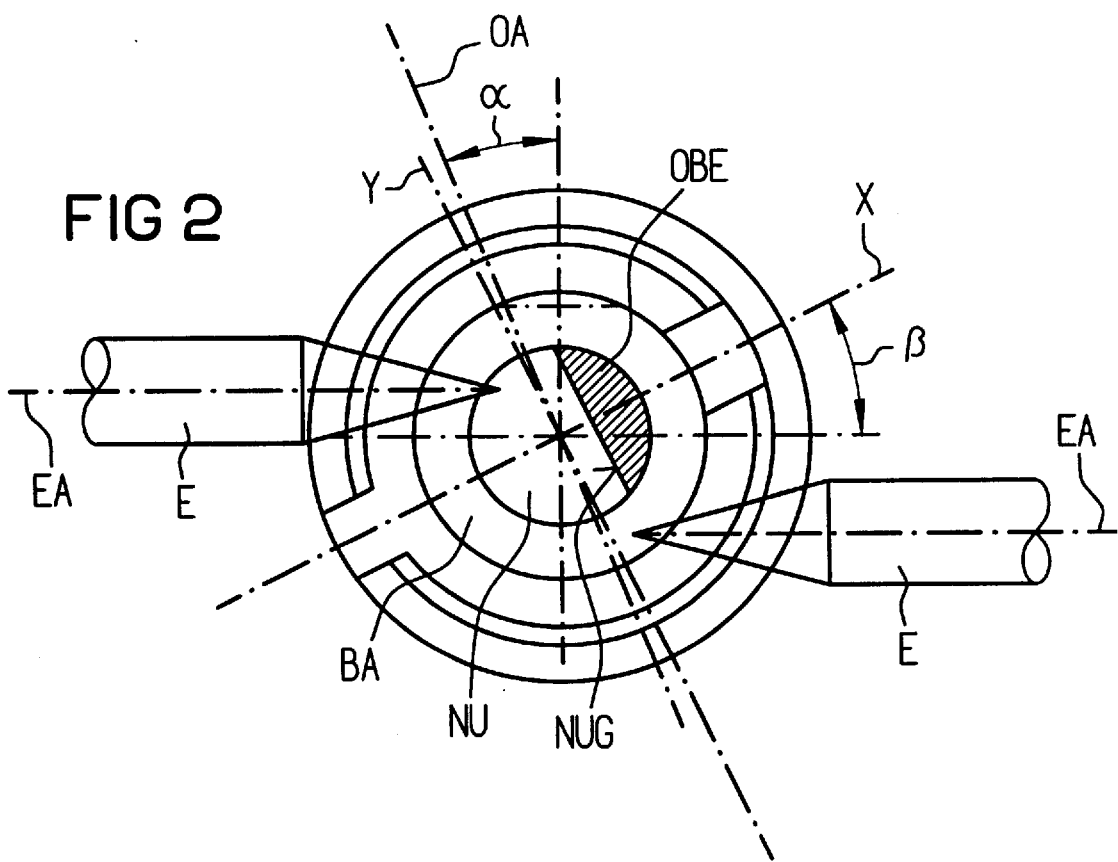

SPLICING MEANS FOR WELDING LIGHT WAVEGUIDES

BACKGROUND OF THE INVENTION

1. Field of the Invention

The present invention is directed toward an apparatus for splicing light waveguides together and, more specifically, to an apparatus for splicing light waveguides together which permits the operator to view the ends of the light waveguides to be welded when the light waveguides and the apparatus are in a welding position.

2. Description of the Prior Art

Light waveguide plugs, in whose hollow-cylindrical plug parts composed of ceramic the optical fibers to be coupled are to be glued as centrally as possible, are employed for the releasable connection of light waveguides. It is thereby known to already glue short optical fiber pieces into the end regions of the plug parts to be coupled in advance and to couple the continuing light waveguides within these plug parts with the assistance of an immersion fluid. The advantage of an exact centering of the optical fibers in the coupling region is opposed here, however, by the disadvantage of a high attenuation of the coupling locations within the plug parts. Further, there is the risk that the immersion fluid will dry up. The introduction of contaminants into the coupling region when inserting the light waveguides into the allocated plug parts can also hardly be avoided.

The earlier patent application bearing serial number PCT/DE95/00413 disclosed a splicing device [sic] for the welding of light waveguides in or immediately at optical components, particularly light waveguide plugs, with which optical fibers glued, for example, in ceramic plug parts can be welded to continuing light waveguides in or immediately at the plug parts. The accessability of the splice locations lying within the plug parts can thereby be assured, for example, by an appropriate transaxial channel of a plug part. The splicing device proposed for this purpose is based on the perception that optimum conditions for the adjustment of the light waveguides to be connected to one another and for the quality of the weld are established when the plug part held in a first receptacle and the optical fiber glued therein are swivelled in and given an axial insertion of the light waveguide held in a second receptacle. In addition to the described employment as plug splicing device, the splicing means can also be generally utilized for the welding of light waveguides in or immediately at other optical components.

Given the splicing means disclosed in the earlier application, the plug with the trans-axial channel must be capable of being turned by an angle of, for example, 60° so that the ends of the light waveguides to be welded to one another can be observed in a first rotational position and the welding of the light waveguides can be implemented in a second rotational position by igniting an arc between two electrodes arranged spaced from one another.

DD 280 399 B1 has disclosed a splicing means for light waveguides wherein the axes of the two welding electrodes are arranged at an angle of 90° relative to one another in order to create a better possibility of observation. The light waveguides to be welded are thereby arranged outside the center of the arc. The light waveguides proceed even farther out of the center of the arc given wear of the electrode tips.

SUMMARY OF THE INVENTION

The present invention is based on the problem of improving the splicing means disclosed in the earlier patent application bearing serial number 195 07 885.3 such that an observation of the ends of the light waveguides to be welded is enabled in the welding position.

The invention is based on the perception that the observation and the welding of the light waveguide ends can be undertaken in the same position of the optical components as a result of a stepped arrangement of the electrodes. An extremely stable, slightly asymmetrically formed arc is thereby ignited between the electrode tips arranged stepped, said arc enabling a qualitatively high-grade weld of the light waveguide ends.

As a result of the parallel alignment of the electrode axes, the overall structural outlay can be reduced and the setting of the electrode spacing can be simplified. Given this arrangement, the tips of the electrodes are arranged lying diametrically opposite one another, so that the optical fibers to be welded lie in the center of the arc where optimum welding conditions prevail. The welding point remains in the center of the arc even given wear of the electrode tips.

In an embodiment, the present invention provides an apparatus for splicing two light waveguides together at an optical component having a channel extending partly through the optical component. The channel exposes the ends of the two light waveguides; the light waveguides are spliced by welding the ends of the light waveguides together. The apparatus includes a first and a second electrode, the two electrodes being directed in generally opposite directions and having axes disposed parallel to one another and spaced apart from one another. The first and second electrodes igniting an arc which crosses through the channel of the optical component and which crosses the ends of the light waveguides to be welded when the ends of the light waveguides and the electrodes are in a welding position. The apparatus further comprises an optical means for observing the ends of the light waveguides to be welded when they are in the welding position.

In an embodiment, the optical component is a waveguide plug.

In an embodiment, the apparatus further comprises a light source disposed opposite the electrodes and the waveguides from the optical means. The light source and the optical means being aligned along a common axis. The common axis extends through the channel, past the electrodes and without crossing the electrodes or crossing the optical component when the waveguides and the electrodes are in the welding position.

In such an embodiment, a clear optical path is provided between the optical means and the ends of the waveguides and a clear optical path is provided between the light source and the ends of the waveguides.

In an embodiment, the optical means is an imaging means that displays an enlarged image of the ends of the waveguides on a screen.

In an embodiment, the optical means is a microscope.

It is therefore an advantage of the present invention to provide an apparatus for splicing two light waveguides together which provides the operator with a view of the ends of the light waveguides to be welded when the ends of the light waveguides and the electrodes are in the welding position.

BRIEF DESCRIPTION OF THE DRAWINGS

An exemplary embodiment of the invention is shown in the drawing and is described in greater detail below.

Shown are:

FIG. 1 illustrates a longitudinal section through a light waveguide plug that enables the welding of a first, glued light waveguide to a second, continuing light waveguide in the region of a transaxial channel;

FIG. 2 illustrates a stepped arrangement of the electrodes, on the basis whereof the observation and the welding of the light waveguide ends is enabled in the same position of the light waveguide plug shown in FIG. 1.

Figure 3:
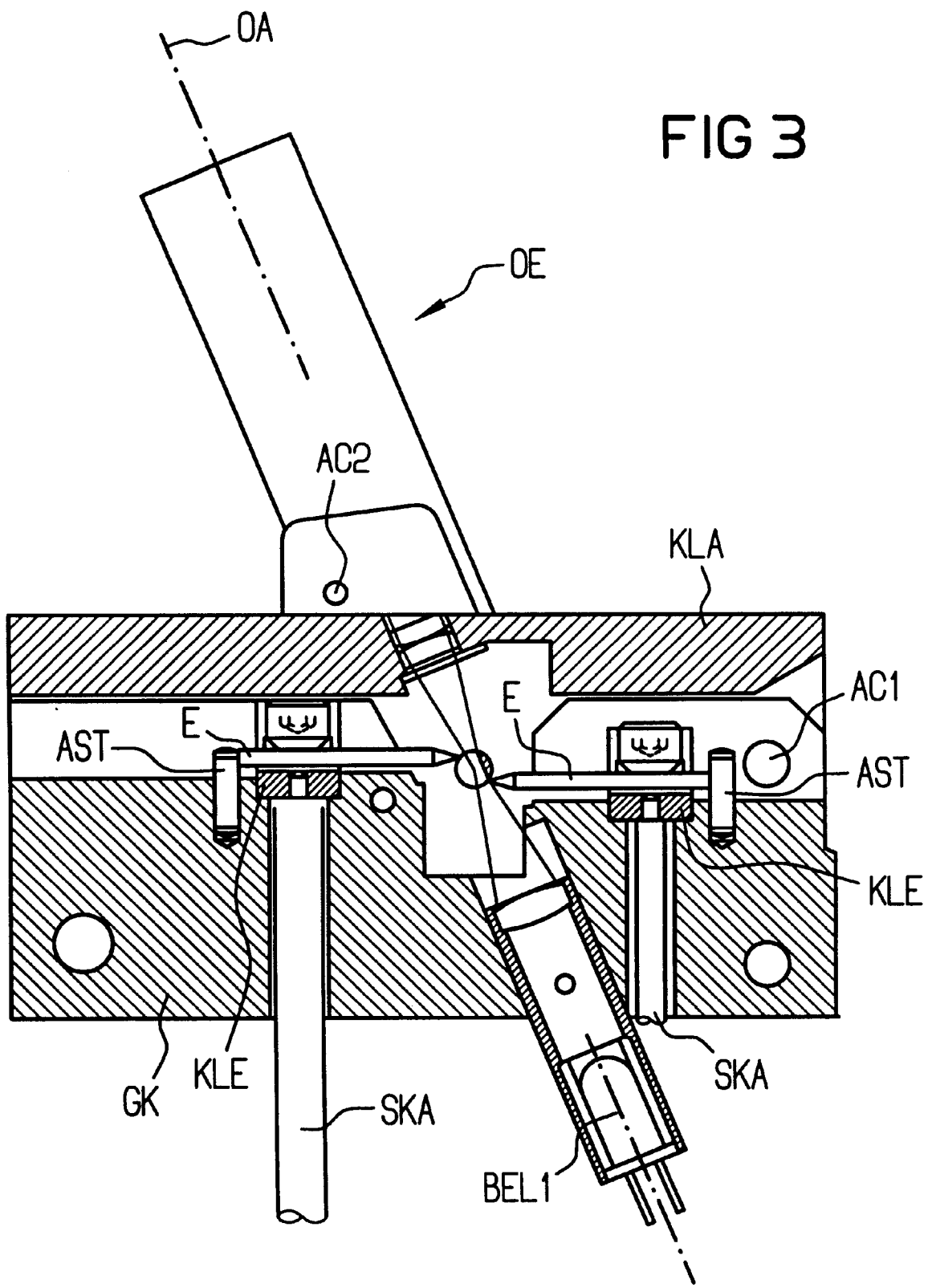
FIG. 3 illustrates a crossection through the corresponding splicing means at the level of the electrodes shown in FIG. 2.

It should be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted. It should be understood, of course, that the invention is not necessarily limited to the particular embodiments illustrated herein.

DETAILED DESCRIPTION OF THE PRESENTLY PREFERRED EMBODIMENTS

FIG. 1 shows a longitudinal section through an optical component referenced OBE overall, whereby this is a matter of a light waveguide plug of ceramic. A short piece of a first light waveguide LWL1 that is to be joined to a second, continuing light waveguide LWL2 by welding in the region of a trans-axial channel NU of the optical component OBE is glued into the optical component OBE. KH references a crimp sleeve that is intended to connect the cable of the second light waveguide LWL2 to the ceramic body of the optical component OBE via a connector part VT composed of steel. An annularly fashioned detent ANS is provided for fixing the optical component in the axial direction.

In a highly simplified, schematic illustration, FIG. 2 shows a stepped arrangement of two electrodes E arranged parallel spaced from one another that, by igniting an arc, effect the welding of the two light waveguides LWL1 and LWL2 shown in FIG. 1. The optical component OBE introduced into a hollow-cylindrical component receptacle BA has its principal axes X and Y proceeding perpendicular and parallel to the channel floor NUG of the channel NU aligned such relative to the two electrode axes EA of the electrodes E that an arc can be ignited in the region of the channel NU. On the other hand, the ends of the two light waveguides LWL1 and LWL2 to be welded can be observed in this position along an optical axis that proceeds through the channel region and is referenced OA. In the illustrated exemplary embodiment, the angle a between the optical axis OA and a line proceeding perpendicular to the electrode axes EA amounts to 22°, and the angle β between the principal axis X and a line proceeding parallel to the electrode axes EA amounts to 26°.

FIG. 3 shows a crossection through a splicing means for welding the two light waveguides LWL1 and LWL2 (see FIG. 1) that, except for the stepped arrangement of the two electrodes E and the inclined course of the optical axis OA, largely corresponds to the splicing means disclosed in the earlier patent application bearing serial number 195 07 885.3. The two electrodes E arranged stepped are respectively connected via clamps KLE to allocated welding cables SKA for the delivery of the welding current. Detent pins AST arranged at the end sides are provided for the setting of the spacing between the tips of the two electrodes E.

A shaft AC1 on which a flap KLA is pivotably seated is arranged on the base member GK serving as electrode holder. The flap KLA in turn carries an optical means OE for the observation of the ends of the light waveguides LWL1 and LWL2 to be connected to one another (see FIG. 1). The course of the optical axis OA of the optical means OE with reference to the electrodes E arranged stepped was already explained in conjunction with FIG. 2. The optical means OE can be pivoted around a shaft AC2 on the flap KLA, i.e. it can be placed against the flap KLA when transporting the splicing means. The optical means OE can be fashioned as microscope or, on the other hand, as an imaging means that images the splice region to be observed on a picture screen.

An illuminations means BELL whose longitudinal axis is aligned in alignment with the optical axis OA of the optical means OE and that illuminates the splice region to be observed between the electrodes E arranged stepped from below is also introduced into the base member GK that was already mentioned above. It can be seen that the observation of the splice region can be undertaken in the same position in which the welding of the two ends of the light waveguides LWL1 and LWL2 is also undertaken.

From the above description, it is apparent that the objects of the present invention have been achieved. While only certain embodiments have been set forth, alternative embodiments and various modifications will be apparent from the above description to those skilled in the art. These and other alternatives are considered equivalents and within the spirit and scope of the present invention.

What is claimed is:

1. An apparatus for splicing two light waveguides together at a light waveguide plug having a channel extending partly through the light waveguide plug, the channel exposing ends of the two light wave guides, the light waveguides having a common optical axis, the light waveguides being spliced by welding the ends of the light waveguides together, the apparatus comprising:

a first electrode and a second electrode, the first and second electrodes being directed in opposing directions, the first electrode terminating at a first end, the second electrode terminating at a second end, the first and second ends being disposed on opposing sides of the common axis of the light waveguides, the first electrode being disposed along a first axis, the second electrode being disposed along a second axis, the first and second axes of the first and second electrodes being parallel to each other and spaced from each other, the first and second axes also lying in a common plane which is perpendicular to the common optical axis of the light waveguides, the first and second electrodes igniting an arc extending between the first and second ends of the first and second electrodes and which crosses through the channel without engaging the light waveguide plug or the electrodes and extends across the ends of the light waveguides to be welded when the ends of the light waveguides and the electrodes are in a welding position, the apparatus further comprising a microscope for observing the ends of the light waveguides to be welded in the welding position, the apparatus further comprising a light source disposed opposite the electrodes and waveguides from the microscope, the light source and optical means being disposed along a common axis, the common axis extending through the channel, between the first and second ends of the first and second electrodes without crossing the electrodes and through the ends of the waveguides when the waveguides and the electrodes are in the welding position, whereby a clear optical path is provided between the microscope and the ends of the waveguides and a clear optical path is provided between the light source and the ends of the waveguides.

2. An apparatus for splicing two light waveguides together at an optical component having a channel extending partly through the optical component, the channel exposing ends of the two light waveguides, the light waveguides having a common optical axis, the light waveguides being spliced by welding the ends of the light waveguides together, the apparatus comprising:

a first electrode and a second electrode, the first and second electrodes being directed in opposing directions, the first electrode terminating at a first end, the second electrode terminating at a second end, the first and second ends being disposed on opposing sides of the common axis of the light waveguides, the first electrode being disposed along a first axis, the second electrode being disposed along a second axis, the first and second axes of the first and second electrodes being parallel to each other and spaced from each other, the first and second axes also lying in a common plane which is perpendicular to the common optical axis of the light waveguides, the first and second electrodes igniting an arc extending between the first and second ends of the first and second electrodes and which crosses through the channel and across the ends of the light waveguides to be welded when the ends of the light waveguides and the electrodes are in a welding position, the apparatus further comprising an optical means for observing the ends of the light waveguides to be welded in the welding position.

3. The apparatus of claim 2 wherein the optical component is a light waveguide plug.

4. The apparatus of claim 2 wherein the apparatus further comprises a light source disposed opposite the electrodes and waveguides from the optical means, the light source and optical means being disposed along a common axis, the common axis extending through the channel, past the electrodes without crossing the electrodes and across the ends of the waveguides when the waveguides and the electrodes are in the welding position.

5. The apparatus of claim 4 wherein a clear optical path is provided between the optical means and the ends of the waveguides and a clear optical path is provided between the light source and the ends of the waveguides.

6. The apparatus of claim 4 wherein the optical means is an imaging means that displays an enlarged image of the ends of the waveguides on a screen.

7. The apparatus of claim 4 wherein the optical means is a microscope.

8. An apparatus for splicing two light waveguides together at a waveguide plug having a channel extending partly therethrough, the channel exposing ends of the two light wave guides, the light waveguides having a common optical axis, the light waveguides being spliced by welding the ends of the light waveguides together, the apparatus comprising:

a first electrode and a second electrode, the first and second electrodes being directed in opposing directions, the first electrode terminating at a first end, the second electrode terminating at a second end, the first and second ends being disposed on opposing sides of the common axis of the light waveguides, the first electrode being disposed along a first axis, the second electrode being disposed along a second axis, the first and second axes of the first and second electrodes being parallel to each other and spaced from each other, the first and second axes also lying in a common plane which is perpendicular to the common optical axis of the light waveguides, the first and second electrodes igniting an arc extending between the first and second ends of the first and second electrodes and which crosses through the channel and across the ends of the light waveguides to be welded when the ends of the light waveguides and the electrodes are in a welding position, the apparatus further comprising an optical means for observing the ends of the light waveguides to be welded in the welding position, a clear optical path being provided between the optical means and the ends of the waveguides when the waveguides and the electrodes are in the welding position.

* * * * *